Dec. 17, 1968  G. P. SAUBERLICH  3,417,394
GEODETIC INSTRUMENT
Filed Feb. 20, 1967  4 Sheets-Sheet 1
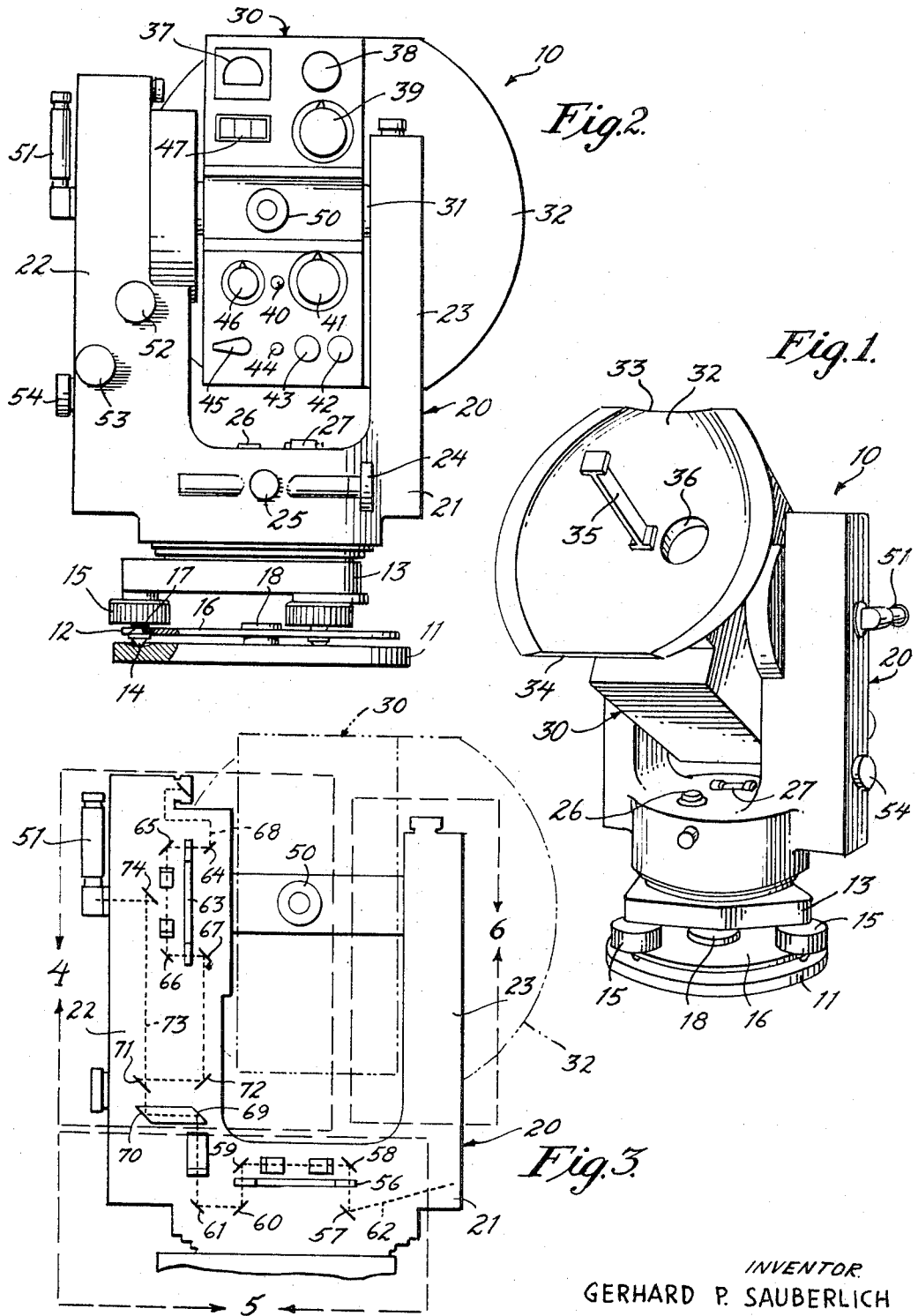
INVENTOR
GERHARD P. SAUBERLICH
BY Robert K. Youtie
ATTORNEY.

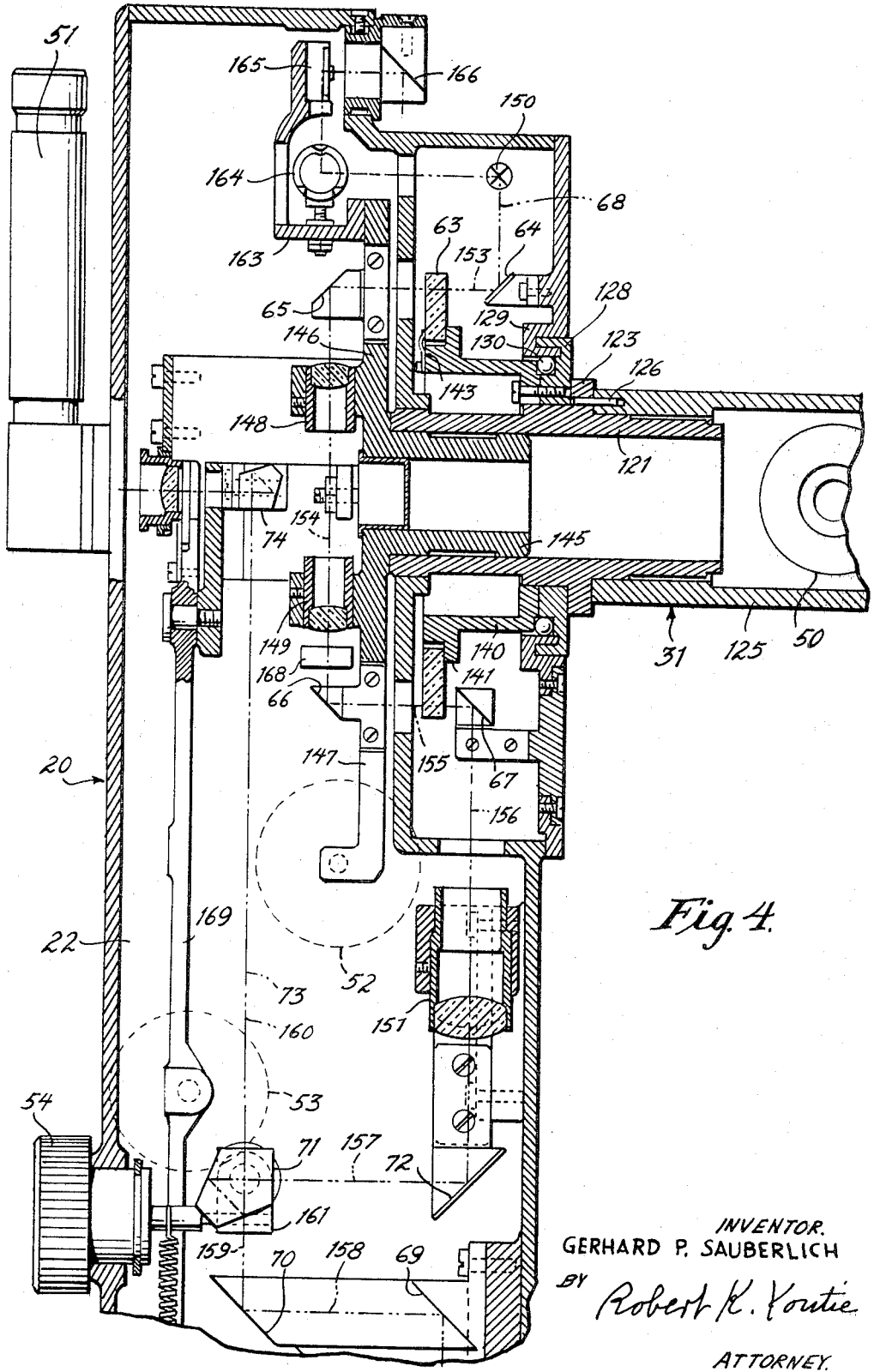

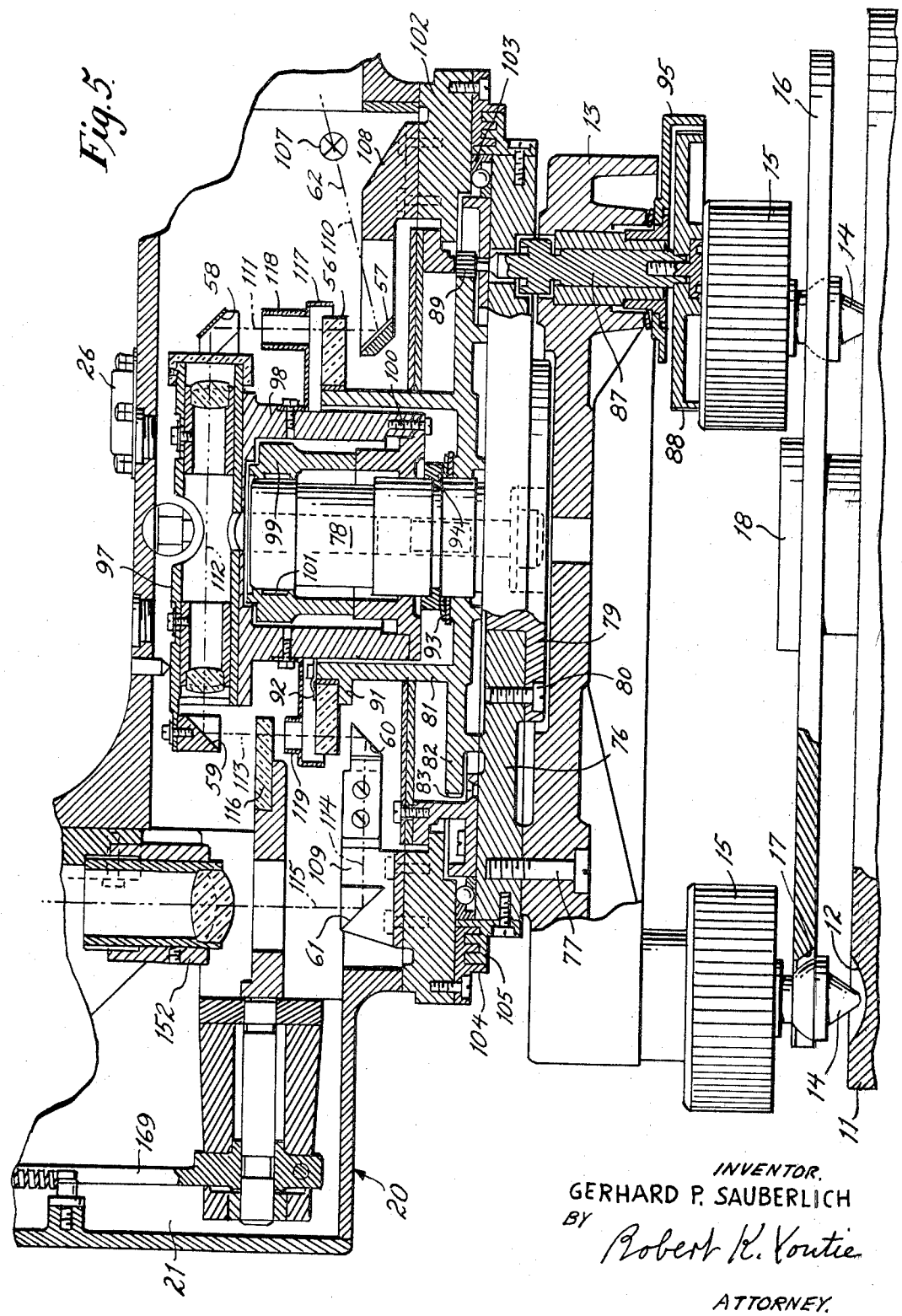

United States Patent Office 3,417,394
Patented Dec. 17, 1968

3,417,394
GEODETIC INSTRUMENT
Gerhard P. Sauberlich, St. Louis, Mo., assignor to E'geo Instruments of America, Inc., a corporation of Florida
Continuation-in-part of application Ser. No. 389,128, Aug. 12, 1964. This application Feb. 20, 1967, Ser. No. 617,246
2 Claims. (Cl. 343—6)

ABSTRACT OF THE DISCLOSURE

This invention is concerned with a geodetic instrument wherein a leveling head is adjustably mounted on a base and a hollow housing rests on the leveling head including a pair of laterally spaced upstanding hollow arms, and wherein shaft means extend between the arms for swingably supporting a telescope and electronic distance-measuring apparatus arranged in substantial axial alignment with the telescope. The housing is provided with simple and highly efficient optical means for illuminating and observing horizontal and vertical angles of housing and telescope adjustment.

---

This invention relates generally to geodetic instruments, and is especially concerned with a geodetic instrument for direct measurement of distances and directions.

The device of the instant invention includes improvements over the device disclosed in my prior copending patent application Ser. No. 389,128, filed Aug. 12, 1964, now Patent No. 3,315,257 and this application constitutes a continuation-in-part of said copending patent application.

It is an important object of the present invention to provide a geodetic-surveying instrument wherein optical and electronic components combine to produce extremely accurate, direct measurements throughout a relatively great range.

It is another object of the present invention to provide a geodetic instrument of the type described which is extremely compact, so as to be relatively small in size and light in weight for convenience in use and ease of portability, and which is extremely quick and easy to operate, with assurance of highly accurate results.

It is a further object of the present invention to provide a geodetic instrument having the advantageous characteristics mentioned in the preceding paragraphs, which is adapted to be employed under most severe operating conditions, including substantially all physical and climatic conditions, and which is entirely reliable and durable throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a rear perspective view illustrating an instrument constructed in accordance with the teachings of the present invention;

FIGURE 2 is a front elevational view showing the instrument of FIGURE 1, partly broken away for clarity;

FIGURE 3 is a diagrammatic front elevational view similar to FIGURE 2, but illustrating schematically the optical system employed herein;

FIGURE 4 is a transverse sectional view, greatly enlarged, illustrating in greater detail the area encompassed within dashed-line 4 of FIGURE 3;

FIGURE 5 is a transverse sectional view, greatly enlarged, illustrating in more detail the area encompassed by dashed-line 5.

Figure 6:
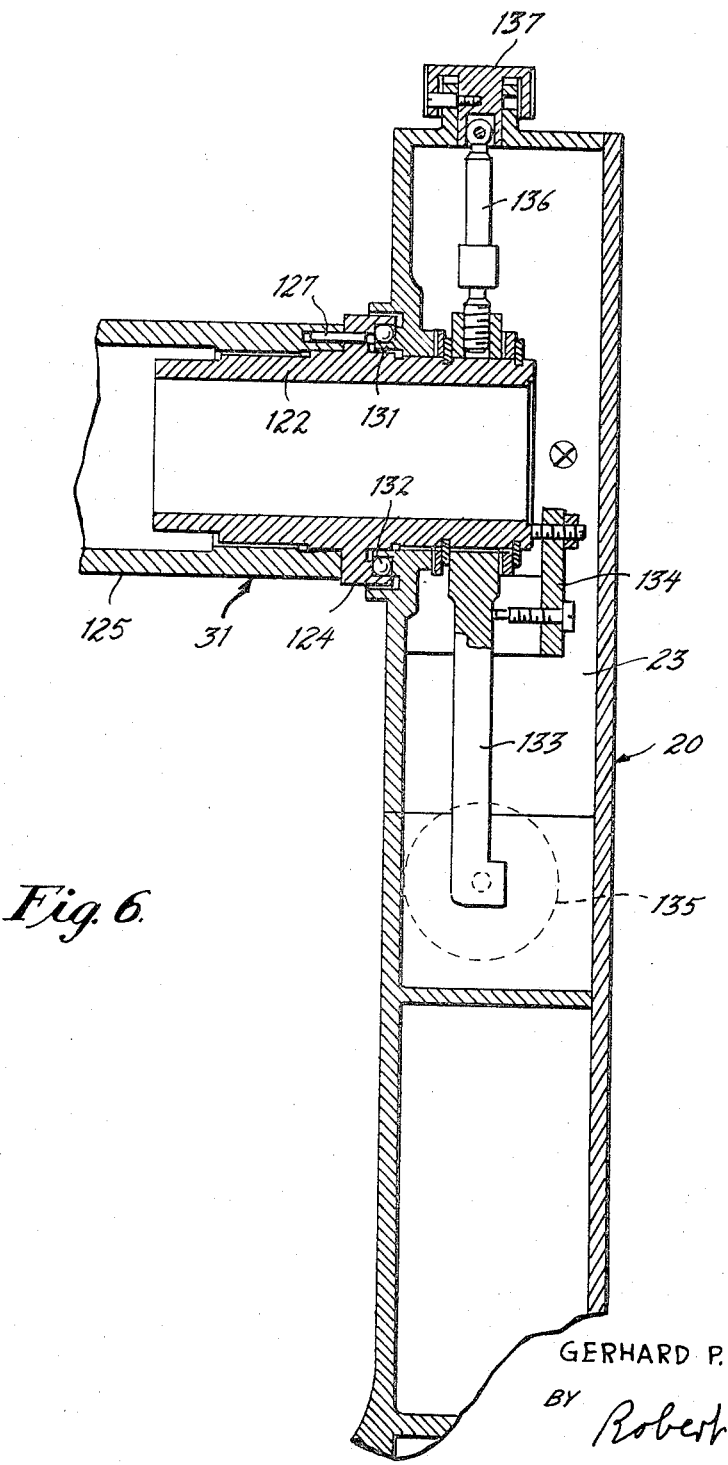
FIGURE 6 is an enlarged transverse sectional view illustrating in detail the area encompassed by dashed-line 6.

Referring now more particularly to the drawings, and specifically to FIGURES 1 and 2 thereof, the instrument is there generally designated 10, and includes a generally horizontal disc-like lower plate or base 11 adapted to be mounted on any suitable support, such as a tripod or the like (not shown). The base 11 may have a plurality, advantageously at least three upwardly facing, spherical recesses 12, say arranged in equiangularly spaced relation about the baseplate. A leveling head 13 is disposed generally horizontally in spaced relation over the baseplate 11 and provided with a plurality of depending feet 14, say three in number arranged for dependence into respective recesses 12. The feet 14 may be each threadedly engaged in the leveling head 13, and provided with knobs 15 for rotating respective feet to effect extension or retraction thereof with respect to the leveling head. The feet 14, by their threaded connections to the leveling head 13, thus enable the leveling head to be leveled on the base 11. A spring plate 16 may be interposed between the base 11 and leveling head 13, having a plurality of apertures 17, respectively receiving feet 14 and engageable therewith to retain the feet in any selected position of their threaded adjustment. The spring plate 16 may be mounted on the base 11 by any suitable means, such as a central post 18.

Superposed on the leveling head 13 is a generally hollow housing, generally designated 20. The housing includes a hollow lower part 21, and a pair of hollow, laterally spaced arms 22 and 23 upstanding from and internally communicating with the lower part 21.

By means appearing more fully hereinafter, the lower housing part 21, and therefore the housing 20, is mounted on the leveling head 13 for rotation about a generally vertical axis. A tangent screw 24 may be mounted in the lower housing part 21 for effecting rotation of the housing, while a clamping screw 25 may be employed to fix the housing against rotation about its vertical axis. On the upper side of the lower housing part 21 there may be provided a circular level 26, and a plate level 27.

Interposed between the housing arms 22 and 23 is a casing, generally designated 30, mounted on generally horizontal shaft means 31 extending laterally between the housing arms 22 and 23, spaced over the lower housing part 21. The casing 30 is thus mounted for rotation about the axis of shaft means 31, as between the horizontal position of FIGURE 2 and the upwardly swung position of FIGURE 1. In the latter figure it is seen the casing carries on its back side a parabolic reflector 32 having chordal cutoffs 33 and 34 at upper and lower diametrically opposed regions to facilitate increased swinging of the casing 30 without obstruction. An antenna or primary feed 35 projects from the reflector 32, and an opening 36 through the projector is located closely adjacent to the antenna.

The casing 30 contains interiorly thereof the electronic components of the distance-measuring device, as disclosed in said copending patent application. Operating controls and meters for the electronic circuitry are advantageously provided on the front side of the casing 30, including a null indicator 37, a resolver 38, modulation-frequency selector 39, automatic-frequency-control switch 40, carrier-frequency selector 41, volume control 42, illumination control 43, power-supply switch 44, telephone-channel switch 45, monitor selector 46, and counter dial 47.

Extending through the casing 30, vertically medially thereof, and intersecting with the shaft axis 31, substantially normal thereto, is a telescope 50, the eyepiece thereof being seen in FIGURE 2, and the telescope-objective viewing through the antenna-reflector opening 36.

Thus, the casing 30, including the antenna 35, its reflector 32, and telescope 50, are all rotatable as a unit about the axis of shaft 31, between the housing arms 22 and 23.

Interiorly of the housing 20, as will appear more fully hereinafter, there are provided calibrated horizontal and vertical circles for measuring the angular disposition of the housing and of the casing 30, together with the telescope 50. Viewing of the horizontal and vertical circles is achieved through a reading microscope 51, conveniently carried on the outer side of housing arm 22. Also provided on the housing 22 are an altitude-level control knob 52, and an optical-micrometer knob 53. An optical inverter knob 54 is also carried by the housing arm 22.

The optical system for viewing the horizontal and vertical circles. In the lower housing part 21 is located the horizontal circle 56, and associated therewith is a group of light-reflecting surfaces 57, 58, 59, 60 and 61 which are arranged to transmit a light beam 62 through the horizontal circle and into the housing arm 22. A vertical circle is designated 63, located in the housing arm 22, and associated therewith is a group of light-reflecting surfaces 64, 65, 66 and 67 which are arranged to pass a light beam 68 through the vertical circle and vertically downward in the housing arm. Additional light-reflecting surfaces 69 and 70 direct the beam 62 to a light reflector or prism 71, while an additional light-reflecting surface 72 directs the beam 68 to the reflective surface 71. The beams thus pass together from light reflector 71, as at 73 to a light reflector 74, and thence to the viewing microscope 51.

Referring now to FIGURE 5, the leveling head 13 is seen as having fixed on its upper side a plate 76, as by fasteners 77. A post 78 extends upward centrally through and beyond the plate 76, being secured to the latter as by a lower end flange 79 on the underside of the plate and fasteners 80 extending through the flange and plate. An annular member or tube 81 spacedly surrounds the post 78 and is provided on its lower end with a generally horizontal base or flange 82 of generally circular configuration and seated on the plate 76. The lower end flange 82 of tube 81 extends radially inward to closely surround the post 78, and extends radially outward, having its external periphery provided with teeth 83 defining a spur gear.

A shaft 87 extends vertically through the leveling head 13 and plate 76, eccentrically thereof, being provided on its lower end beneath the leveling head with a knurled finger-actuable nut 88. On the upper end of shaft or pin 87 is carried a pinion 89 in meshing engagement with the teeth 83, whereby the annular member or tube 81 is selectively rotatable for fine angular adjustment about the post 78 by actuation of nut 88. A horizontal circle 56, say of transparent material in an annular configuration and having suitable angular calibration, is circumposed about an upper region of the tube 81, being supported at its underside by a flange or bracket 91 outstanding from the tube, and held in position thereabout by one or more leaf springs 92.

The sleeve or tube 81 is held frictionally by spring-washer means 93 circumposed about the shaft 78 and resiliently sandwiched between the flange 82 and a retainer ring 94. Also, to prevent inadvertent rotation of the sleeve 81 by the fine-adjustment nut 88, a protective cover 95 is swingable into and out of covering relation with respect to the nut.

Directly over the post 78 in the lower housing region 21 is a generally horizontal lens tube 97, mounted by any suitable means fixedly within the housing, and having its optical axis intersecting the axis of the post. The lens tube 97 is provided at its opposite ends with the obliquely downwardly facing reflective surfaces 58 and 59, which may be mirrored prisms, or the like. Depending from the horizontal lens tube 97 is a generally vertical mounting tube 98, received within the tube 81 and spacedly surrounding the post 78. Interiorly of the tube 98 is a journal sleeve 99 disposed generally vertically and surrounding the post 78. The lower end of the journal sleeve 99 may be fixed to the lower end of the tube 98, as by fasteners 100. Interiorly of the sleeve 99 are provided suitable bearing means, such as roller bearings 101 in bearing engagement with the post 78. Thus, the housing 20 is constrained to rotative movement about the post 78 by the sleeve 99 fixed in the housing and carrying bearings 101.

The underside of the lower housing part 21 is centrally open, and provided with a generally annular bottom plate 102 superposed over the leveling-head plate 76. Interposed between the leveling-head plate 76 and housing bottom plate 102, and circumposed in spaced concentric relation about the axis of post 78, is a rotary thrust bearing 103, say of ball-bearing construction. The housing 20 is thereby freely mounted for rotation about the axis of post 78 while supported on the plate 76 of the leveling head 13. Carried by the underside of the housing bottom plate 102, and by the leveling-head plate 76 are respective members 104 and 105 in interfitting freely movable relation and combining to define a dust and moisture seal.

Also mounted in the lower housing part 21 are a light source 107, and the diametrically opposed reflective surfaces 57 and 60, respectively disposed parallel to and below reflective surfaces 58 and 59. The reflective surfaces 57 and 60 may be mirrored prisms, or other suitable construction, and are respectively carried on brackets 108 and 109 fixed to the upper side of housing bottom plate 102. The bracket 109 may also include the reflective surface 61, in the form of a silvered prism, or the like. It will now be appreciated that light rays from the source 107, which may be an electric bulb, pass, as at 110 to the surface 57, being reflected therefrom at 111 to the surface 58, and thence through lens tube 97, as at 112, whence they are reflected by surface 59 to surface 60, as at 113. From surface 60 the light rays are reflected along optical axis 114 to surface 61, and thence vertically upward, as at 115 into the housing arm 22. Of course, the light rays 111 and 113 pass vertically through diametrically opposed regions of the horizontal circle 56, while the light rays 113 pass additionally through a micrometric scale 116, which will be described more fully hereinafter. Protectively covering the horizontal circle 56 may be a generally horizontal shield 117 of generally annular configuration and secured fast to the tube 98. The shield 117 may have light-permeable openings 118 and 119 respectively passing light rays 111 and 113.

Spaced over the lower housing part 21, the upstanding hollow housing arms 22 and 23 are respectively provided on their inner or facing sides with generally aligned openings respectively receiving shaft sections 121 and 122. The shaft sections 121 and 122 may be of hollow or tubular formation, and arranged in axial, end-to-end spaced alignment. Further, the shaft sections 121 and 122 project, respectively, inward toward each other from housing arms 22 and 23, and terminate short of each other, for a purpose appearing presently. The shaft section 121 carries an annular collar 123 adjacent to the arm 22, while the shaft section 122 carries an annular collar 124 adjacent to the housing arm 23. An intermediate shaft section 125 extends between the shaft sections 121 and 122, being fixedly secured thereto, as by fasteners 126 and 127, extending through collars 123 and 124. An inner bearing race 128 is fixedly circumposed about the shaft section 121 and mates with outer bearing race 129, there being rollable bearing elements or balls 130 retained between the inner and outer races to mount the shaft section 121 for axial rotation. The collar 124 of the shaft section 122 is configured to define an outer bearing race in mating relation with an inner bearing race 131 formed of the housing arm 23, which races contain therebetween a plurality of rollable bearing elements or balls 132. Thus, the shaft sections 121, 122 and 125 combine to define the shaft means 31 and are mounted for axial rotation about the horizontal relative to the housing 20.

In FIGURE 6 it will appear that the shaft section 122, interiorly of the housing arm 23, carries an operating arm 133, as by a bracket 134. Further, the operating arm 133 may be moved from externally of the housing arm 23 by a tangent screw 135. Also, the housing arm 23 is provided internally thereof with a clamping screw 136 movable radially of the shaft section 122 into and out of clamping engagement therewith as by a knob 137 externally of the housing arm.

Referring now to the detailed drawing of FIGURE 4, it will be seen that a generally annular collar 140 is circumposed about the shaft section 121, interiorly of the housing arm 22, and is provided with an external lip or flange 141 for seating engagement with one side of an annular transparent member 63 defining a vertical circle. The vertical circle is marked with suitable angular calibration, and held in place against the flange 141, as by a leaf spring 143. Thus, the vertical circle 63 is held to rotate together with the shaft means 31 about the axis thereof.

A hollow tube or shaft 145 is rotatably mounted in the shaft section 121, extending therefrom into the interior hollow of housing arm 22, and is here provided with upper and lower extensions 146 and 147. A pair of aligned upper and lower lens mounts 148 and 149 are carried by the extensions 146 and 147 adjacent to the shaft 145. Over the upper lens mount 148, mounted on the extension 146, is the reflective surface 65, which may be a mirrored prism, or the like. Carried by the lower extension 147, below the lens mount 149 is a prism or reflective surface 66. The reflective surface 64 is mounted in the housing arm 22, generally parallel to and level with the reflective surface 65, and substantially directly below a light source 150. Generally parallel to and substantially level with the reflective surface 66 is a reflective surface 67, as of a mirrored prism, or the like, fixedly supported by the housing arm 22. A lens tube 151 is disposed vertically below the reflective surface 67, and an additional reflective surface 72 is mounted in the housing arm 22 directly below the lens tube 151. In a lower region of the housing arm 22, directly over the reflective surface 61 of the lower housing part 21, there is disposed a vertical lens tube 152, fixed in the housing arm; and, directly over the lens tube 152 there is fixed the reflecting surface 69, as of a prism, and an additional, generally parallel reflecting surface 70, substantially level with the reflecting surface 69. Rotatably carried in the housing arm 22, horizontally level with the reflective surface 72 and vertically over the reflecting surface 70 is a combining prism 71. An additional reflective surface or prism 74 is mounted in the housing arm 72 vertically over the prism 71 and in horizontal alignment with the viewing microscope 51.

It will now be appreciated that light rays 68 from the source 150 will reflect from surface 64 horizontally through one region of the vertical circle 63, as at 153, and thence reflect from the vertical surface 65 vertically downward through lens tubes or mounts 148 and 149, to surface 66, as rays 154. The light rays then pass horizontally, at 155 from surface 66 through a diametrically opposed region of the vertical circle 63 to reflective surface 67, and thence vertically downward at 156 through lens tube 151 to reflective surface 72, and thence at 157 to prism 71. The vertical rays from reflective surface 61 in the lower housing part 21 pass vertically upward at 115 through lens tube 152, to reflective surface 69, and thence at 158 to reflective surface 70, and thence vertically at 159 to prism 71. The rays 157 and 159 are reflected by prism 71 to pass together, as rays 160, to prism 74, whence they are reflected for viewing into microscope 51.

The prism 71 is mounted for rotation in the housing arm 22 and adapted to be rotated by any suitable means, such as a worm-and-wheel 161 controlled by the external inverter knob 54. By this means the image transmitted to the microscope may be inverted, as desired.

At the upper end of upper extension 146 may be carried a bracket 163 carrying a light reflector 164 for receiving light from the source 150 and reflecting the light to an additional reflector 165. From reflector 165 the light is reflected to a viewing window 166, where it may optionally be observed.

While rotatable about the axis of shaft section 121, the shaft 145, its extensions 146 and 147, and the elements carried thereby, are adjustably held against rotation by the altitude-level control knob 52, which may be connected by gearing, or other suitable means, to the extension 147. In addition, there is interposed in the path of light between source 150 and the microscope 51, say in path 154, a micrometric scale 168 for use with the vertical circle, and mounted by any suitable means (not shown). The micrometric scale 116 in the lower housing part 21, interposed in the light path 113, is mounted by a suitable linkage 169 for actuation by the micrometer knob 53 in cooperative relation with the horizontal circle 56.

Carried by the intermediate shaft section 125, for rotation therewith, is the casing 30, containing the electronic components of the instant device. Also carried by the intermediate shaft section 125 is the telescope 50, which extends through the intermediate shaft section, being fixedly mounted therein with its optical axis at ninety degrees to the axis of the shaft means 31.

From the foregoing, it will now be appreciated that the device of the present invention is fully adapted to accomplish its intended objects and meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A geodetic instrument comprising a base, a leveling head on said base, a post upstanding from said leveling head, a hollow lower housing part resting on said leveling head and receiving said post, housing-bearing means mounting said lower housing part for rotation on said leveling head about the axis of said post, a pair of laterally spaced hollow housing arms upstanding rigidly from said lower housing part for rotation therewith, shaft means extending laterally between said arms spaced over said lower housing part and intersecting the axis of said post for rotation with said arms, shaft-bearing means carried by said arms and journaling said shaft means for axial rotation thereof, a telescope carried medially by said shaft means having its optical axis intersecting the shaft-means axis at substantially ninety degrees, electronic distance-measuring means carried by said shaft means for movement therewith and having its transmitting and receiving axes substantially aligned with said optical telescope axis, a calibrated annulus defining a horizontal circle and disposed generally horizontally within said lower housing part generally concentric with said post, horizontal-circle mounting means mounting said horizontal circle in fixed relation with respect to said leveling head, a calibrated annulus defining a vertical circle and disposed generally vertically within one of said housing arms generally concentric with said shaft means, vertical-circle mounting means mounting said vertical circle in fixed relation with said shaft, optical-circle-reading means carried by said one arm, and light-directing means associated with each of said circles for directing light from the respective circle to said circle-reading means, said light-directing means associated with said horizontal circle comprising a first light source in said lower housing part adjacent to said other arm; a first group of light-reflective surfaces in said lower housing part arranged to reflect light from said first source upwardly through one region of said horizontal circle diametrically over said post, downwardly through a diametrically opposed region of said horizontal circle, and upwardly into said one arm; said light-directing means associated with said vertical circle comprising a second light source in an upper region of said one arm; a second group of light-reflective surfaces in said one arm to reflect light from said second source laterally outward through an upper region of said vertical circle, downwardly diametrically across said shaft means, laterally inwardly through a diametrically opposed region of said vertical circle, and generally vertically in said one arm; and additional light-reflective surfaces for receiving light from both said first and second groups of surfaces and transmitting the received light to said circle-reading means.

2. A geodetic instrument comprising a base, a leveling head on said base, a post upstanding from said leveling head, a hollow lower housing part resting on said leveling head and receiving said post, housing-bearing means mounting said lower housing part for rotation on said leveling head about the axis of said post, a pair of laterally spaced hollow housing arms upstanding rigidly from said lower housing part for rotation therewith, shaft means extending laterally between said arms spaced over said lower housing part and intersecting the axis of said post for rotation with said arms, shaft-bearing means carried by said arms and journaling said shaft means for axial rotation thereof, a telescope carried medially by said shaft means having its optical axis intersecting the shaft-means axis at substantially ninety degrees, electronic distance-measuring means carried by said shaft means for movement therewith and having its transmitting and receiving axes substantially aligned with said optical telescope axis, a calibrated annulus defining a horizontal circle and disposed generally horizontally within said lower housing part generally concentric with said post, horizontal-circle mounting means mounting said horizontal circle in fixed relation with respect to said leveling head, a calibrated annulus defining a vertical circle and disposed generally vertically within one of said housing arms generally concentric with said shaft means, vertical-circle mounting means mounting said vertical circle in fixed relation with said shaft, optical-circle-reading means carried by said one arm, and light-directing means associated with each of said circles for directing light from the respective circle to said circle-reading means, said horizontal-circle mounting means comprising an annular mounting member within said lower housing part circumposed about said post and rotatively adjustable relative thereto, and gear means operatively connected between said annular mounting member and leveling head exteriorly of said lower housing part for rotatively adjusting said annular mounting member relative to said leveling head.

References Cited

UNITED STATES PATENTS

| | | | |
|---|---|---|---|
| 2,703,039 | 3/1955 | White | 343—10 X |
| 2,757,567 | 8/1956 | Hillman et al. | 33—69 X |
| 2,802,207 | 8/1957 | Sommers et al. | 343—17.7 |
| 2,937,559 | 5/1960 | Shute et al. | 343—10 X |

RODNEY D. BENNETT, *Primary Examiner.*

M. F. HUBLER, *Assistant Examiner.*

U.S. Cl. X.R.

33—69